United States Patent [19]

Munemasa et al.

[11] Patent Number: 4,843,752

[45] Date of Patent: Jul. 4, 1989

[54] ACARID EXTERMINATING DEVICE

[75] Inventors: Shinichi Munemasa; Kanji Ueki; Eiichi Yoshino, all of Fukuoka, Japan

[73] Assignee: Sanix, Inc., Fukuoka, Japan

[21] Appl. No.: 92,223

[22] Filed: Sep. 2, 1987

[30] Foreign Application Priority Data

Apr. 9, 1986 [JP] Japan ............................... 61-053795
Apr. 9, 1986 [JP] Japan ............................... 61-083057

[51] Int. Cl.$^4$ ................................................ A01M 5/00

[52] U.S. Cl. ........................................ 43/140; 43/138; 43/144

[58] Field of Search ................ 43/138, 140, 141, 144, 43/124

[56] References Cited

U.S. PATENT DOCUMENTS 1,921,901 8/1933 Anderson ............................. 43/144

FOREIGN PATENT DOCUMENTS 2828743 1/1980 Fed. Rep. of Germany ........ 43/144
0719577 3/1980 U.S.S.R. ............................... 43/138

*Primary Examiner*—Kurt Rowan
*Attorney, Agent, or Firm*—Flynn, Thiel, Boutell, & Tanis

[57] ABSTRACT

The present invention relates to a device to exterminate dust ticks, bedbugs and fleas inhabitant in carpets, tatami mats and others in a simple manner, and said device is provided with a base body movable along the subject of extermination such as carpet and others, and a far-infrared ray emission unit to radiate far-infrared rays toward said subject of extermination.

2 Claims, 5 Drawing Sheets

ACARID EXTERMINATING DEVICE

BACKGROUND OF THE INVENTION

1. Field of the Invention

The present invention relates to a device to exterminate acarid, and, more particularly, to a device to exterminate harmful ticks, bedbugs and fleas inhabitant in carpets, tatami mats and others in a simple manner.

2. Description of the Art

Conventional methods for exterminating acarid are, firstly, methods to destroy inhabitant conditions for acarid by air ventilation of rooms, thorough cleaning, carpet cleaning and others, or secondly, methods to exterminate acarid directly by exposing them to the sunlight, or by using acaricides and others.

However, in the abovementioned methods there exist such problems as are described in the following:

(1) Exterminating methods which make use of air ventilations, thorough cleanings and carpet cleanings raise the problems that they require much labor, their effects are not sustained for long, and particularly in room air ventilation, the effect of eliminating humidity sometimes cannot be obtained due to the influence of the humidity of the ambient air, and, in extermination by thorough cleaning, the effect remains superficial because the cleaners used have insufficient capacity and therefore cannot be expected to suffice for the intended purpose.

(2) The exterminating method which makes use of exposure to sunlight also raises problems: while acarid extermination can be effectively performed by drying and heating carpets and others in strong sunlight, the method is not only influenced by natural weather, but also requires much time and labor for the transfer of carpets and tatami mats or other weighty objects to sunny places, thus there is much inconvenience in its practice.

(3) In the exterminating method employing acaricides, there are also problems: their toxicities limit their use to areas where no contact with humans can be expected, which sometimes results in imperfect exterminations, and additionally, the smell of acaricides remains after their use. Also, the choice of acaricide usually depends upon the type of acarid to be killed, and the necessity of starting the operation by determining the type or types of inhabitant acarid is troublesome. In the case of tatami mats, the penetration of acaricides is difficult due to the large volumes and density of straw used, and liquid agents may cause excess humidification of the room, thus this method can reveal many long term disadvantages.

SUMMARY OF THE INVENTION

The first object of the present invention is to provide an acarid exterminating device capable of exterminating acarid inhabitant within carpets, tatami mats and others in a simple way.

In addition to the exterminating effect on acarid, the second object of the present invention is to provide an acarid exterminating device capable of preventing the reappearance of acarid, even after the extermination thereof, by decreasing the humidity of carpets, tatami mats and others, as well as being able to produce a drying effect on carpets and others.

To accomplish the abovementioned objects, the acarid exterminating device in accordance with the present invention is made to be of a structure provided with a base body which is movable along the subject of extermination, and a far-infrared ray emission unit provided on said base body to radiate far-infrared ray on said subject of extermination.

In an acarid exterminating device of the present invention, a far-infrared ray emission unit moves along the subject of extermination with the movement of a base body, radiating far-infrared rays on said subject with a constant spacing thereto, and the far-infrared rays radiated are electromagnetic waves of specially long wavelength in the infrared region, which waves excite thermal agitation within substances with a strong effect to raise the substance temperature; therefore, said device can effectively exterminate the acarid inhabitant within tatami mats and carpets by heating, as well as drying, the depth of tatami mats and carpets within a short period of time; the device also excels in operability.

Further, the far-infrared rays exert their action directly on water molecules within a substance to generate heat within, and therefore, have a high drying effect: for this reason, the preventive effect against acarid appearance will be maintained for a sustained period because of the lowered humidity after the execution of abovedescribed acarid exterminations.

In addition, the heating of the medium such as air and others can be dispensed with because the far-infrared rays provide a direct heating system: accordingly, energy consumption is lower.

Next, the radiation with far-infrared rays can be accomplished by a movable base body for carpets and others which are left spread wide, and the task of transferring carpets and tatami mats to the outside of the room become unnecessary, therefore, the work of acarid extermination can be performed efficiently and effectively.

DETAILED DESCRIPTION OF PREFERRED EMBODIMENTS

Figure 1:
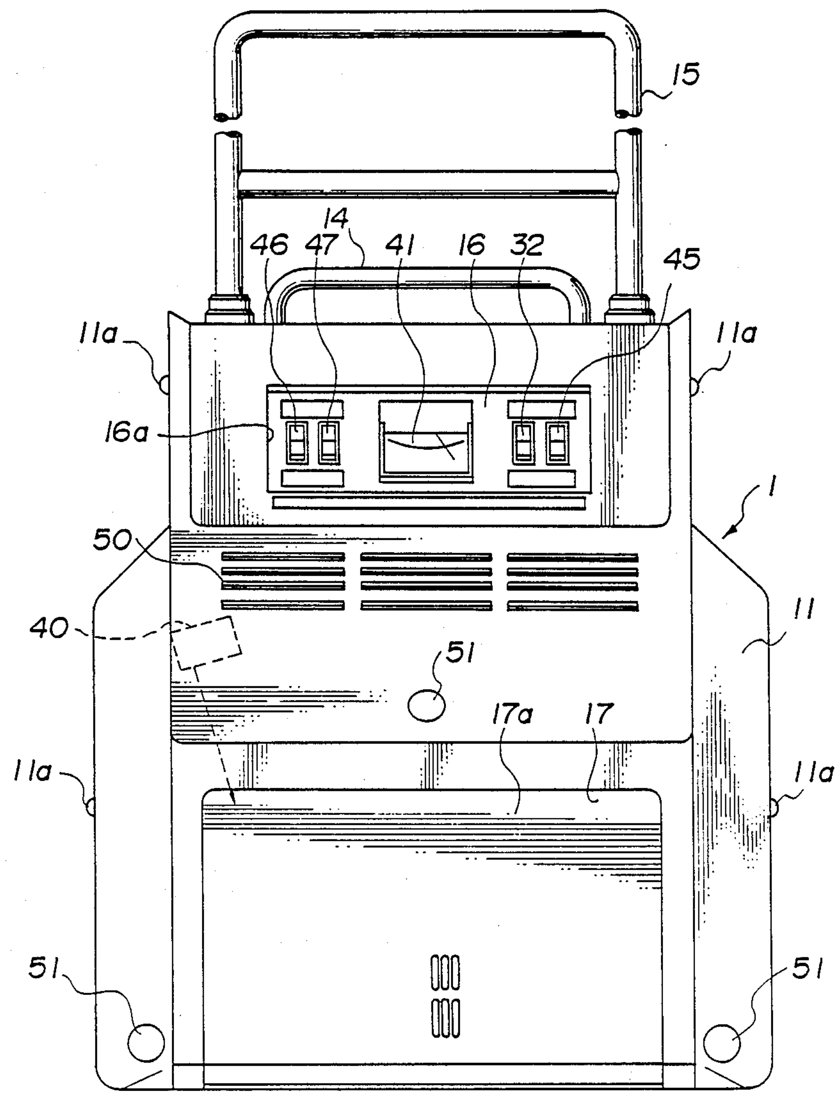
FIG. 1 shows a plan view of an acarid exterminating device as a first embodiment in accordance with the present invention.
Figure 2:
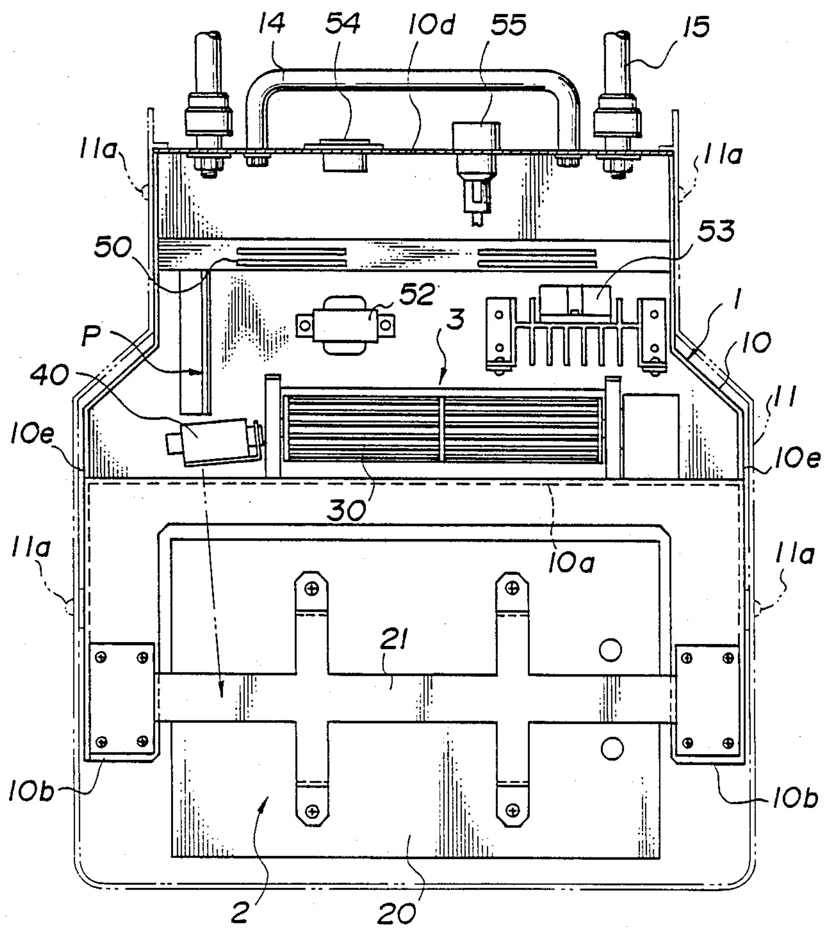
FIG. 2 shows a plan view of the abovementioned device with its upper casing removed.
Figure 3:
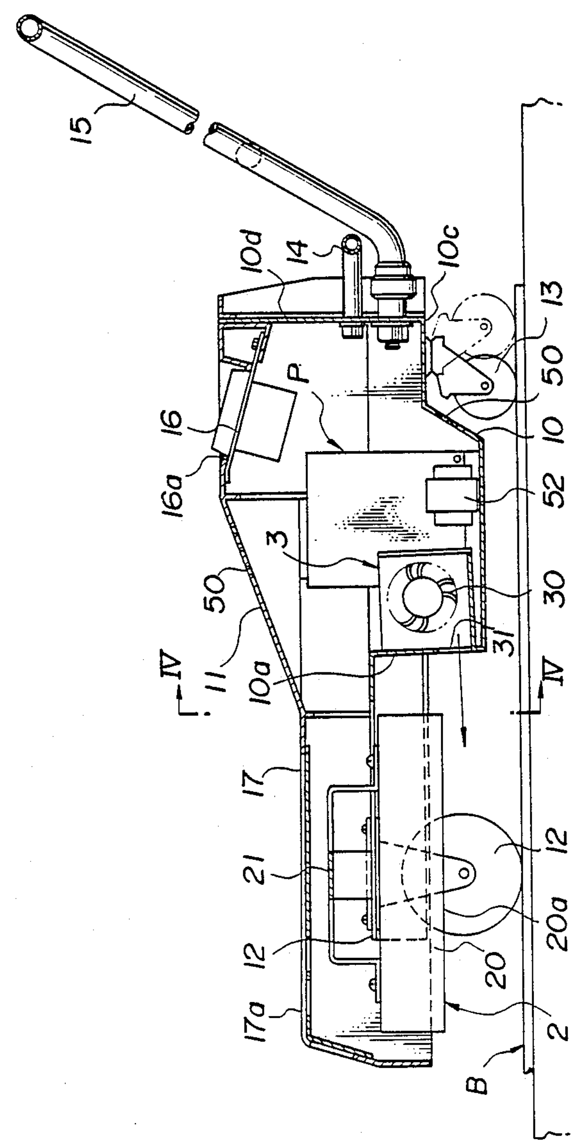
FIG. 3 shows a central longitudinal cross section side view of the device in FIG. 2.
Figure 4:
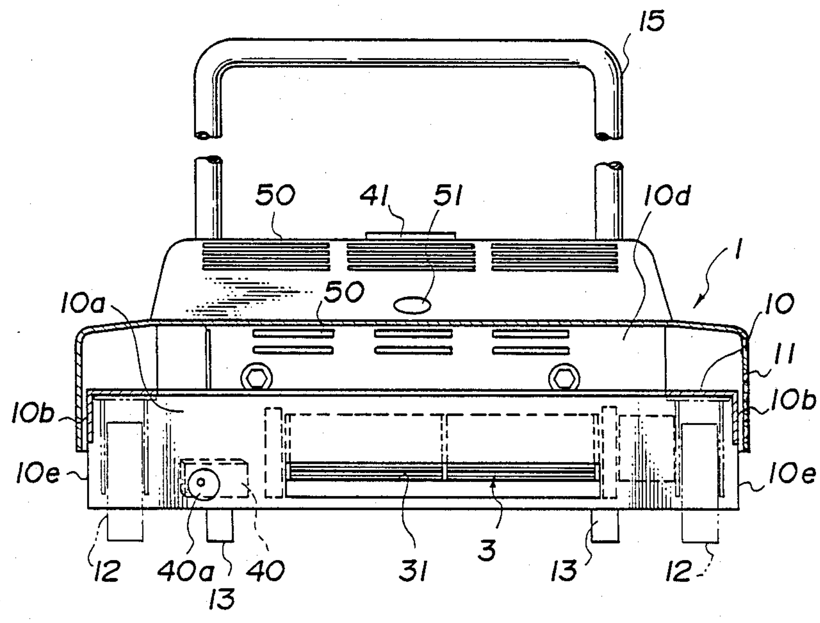
FIG. 4 shows a front sectional view along the line IV - IV in FIG. 3.
Figure 5:
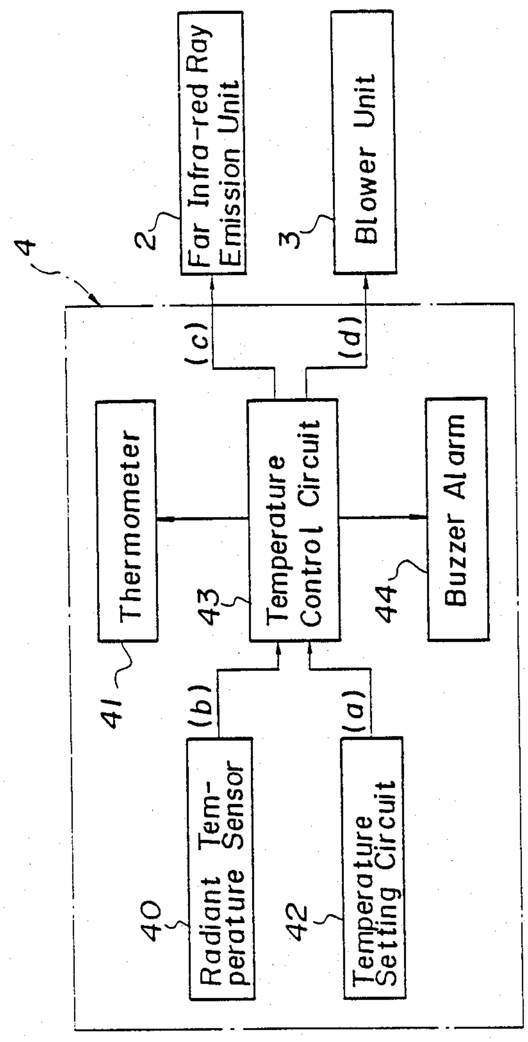
FIG. 5 shows a block diagram to illustrate a temperature control unit.

FIG. 1 to FIG. 5 show an acarid exterminating device A as a first embodiment. This acarid exterminating device is provided with a base body 1, a far-infrared ray emission unit 2, a blower unit 3 and a temperature control unit 4.

Said base body 1 is provided with a lower frame 10 and upper casing 11.

The lower frame 10 contains the relevant components, and is formed from metal sheets into a box-like shape and is provided with an opening in the top side, and supporting arms **10*b* and 10*b* located on the right and left sides, respectively, of the top edge of the front wall 10***a* of the frame 10, said supporting arms protruding approximately in the direction of the front.

Further, on the backside of the front ends of said supporting arms 10*b* and 10*b* are provided wheels 12 and 12 of a fixed type for movement, and on the ends in both sides of a stepped section 10*c* which is formed on the backside of the rear end of said lower frame 10*c* are provided wheels 13 and 13 of a rotative type for movement.

Furthermore, the rear side wall 10*d* of the lower frame 10 is so formed that said wall 10*d* may protrude more upwards than other side walls, and a handle 14 is provided at approximately the middle section of the wall 10*d*, and at the lower end of the wall 10*d* is provided an operating frame 15 in an upright and inclined rearward position, and on the top in the internal side of said rear side wall 10*d* is attached an operating panel 16 as a protrusion.

The upper casing 11 covers the opening on the top of said lower frame 10, is made of a heat-resistant synthetic resin material (styrene kraftized polyphenylen ether derivative resin plus glass fiber 20%), is formed as an approximately box-like shape which opens on the under side and the rear side, is placed so as to cover the outer sides of both right and left side walls 10*e* and 10*e* of the lower frame 10 and is mounted with four setscrews 11*a* so that said casing may be removed as required.

Further, on the rear top of the upper casing 11 is provided an open window 16*a* for abovementioned operating panel 16, and a perforated plate 17*a* is mounted in an aperture 17 having been opened on the front top of said casing.

The abovementioned far-infrared ray emission unit 2 is a device to radiate far-infrared rays onto the subject of extermination such as carpets, tatami mats and others, and, in this embodiment, a surface heater 20 is used. The surface heater 20 is laterally mounted so as to bridge the space between the ends of the top surface of both supporting arms 10*b* and 10*b* being held in such a suspended state by an attaching arm 21 so that said heater may be given a specified spacing in relation to the lower frame 10 and the upper casing 11, and in particular, the heater 20 is installed parallel and opposed to the subject B of extermination such as carpets, tatami mats and others so that a spacing of 5 cm may be maintained to said subject.

The abovementioned blower unit 3 is a device to prevent the burning of the subject of extermination, and in this embodiment a cross-flow fan 30 is used. Further, this cross-flow fan 30 is made to deliver a forced draft toward the space which is formed between the surface heater 20 and the subject of extermination by mounting said cross-flow fan on the internal side of the front wall 10*a* in said lower frame 10 and further by providing the outlet nozzle 31 of said fan 30 on the front wall 10*a*. In addition, the cross-flow fan 30 can be turned on or off independently by a manual blower switch 32 provided on the operating panel 16, and further is made to be operated by the hereinafter described temperature control unit 4.

The abovementioned temperature control unit 4 is a device to protect the subject B of extermination from being heated above the established temperature (80° C.), and is provided with a radiant temperature sensor 40 to detect the surface temperature of the subject B of extermination, a thermometer to indicate said detected temperature, a temperature setting circuit 42 a temperature control circuit 43 which outputs a control signal c for opening the power supply circuit to the surface heater 20 to stop the radiation of far-infrared rays when the input signal b of the detected temperature from the radiant temperature sensor 40 is to be found higher in comparison with the established input signal a from said temperature setting circuit 42, as well as outputting a signal d for closing the supply power circuit to the cross-flow fan to start the blowers, and a buzzer alarm 44 for warning by sound that the established temperature (80° C) of the subject B of extermination has been exceeded. In place of said buzzer alarm 44, an indication of such an alarm may suffice, or an alarm by indication, accompanied by the alarm by sound may also suffice.

Further, the abovementioned radiant temperature sensor 40 is mounted adjacent to the front wall 10*a* at the left end in the lower frame 10, and in said front wall 10*a* is provided an aperture 40*a* to admit radiant heat from the subject B of extermination opposite the surface heater 20

Additionally, said temperature setting circuit 42, temperature circuit 43, and buzzer alarm 44 are incorporated into a print plated circuit which is provided in the lower frame 10.

On the other hand, said thermometer 41 is provided in the operating panel 16, on which also are provided a main power source switch 45, a power switch 46 for the temperature control circuit, and a selector switch 47 for tatami mats or carpets. On turning on the main power source switch 45, the power supply is made available to the temperature control circuit 45 and surface heater 20, and, on turning on the power switch 46 for the temperature control circuit, the radiant temperature sensor 40 starts to function at the same time that the power supply to the surface heater 20 also starts. Further, the selector switch 47 for tatami mats or carpets is a changeover switch to compensate for the difference between the radiation rates for tatami mats and carpets.

In the drawings are also illustrated an inlet hole 50, a thermolabel 51, a transformer 52, and isolating transformer 54, (53), a socket 54 for connecting a power source cord and a fuse 55.

Subsequently, in performing the acarid killing for the subject of extermination such as tatami mats, carpets and others, the main power source switch 45 and the power switch 46 for the temperature control circuit are firstly turned on to energize the surface heater 20 and the temperature control circuit 45, and then the surface heater 20 is heated to radiate far-infrared rays toward the subject B of extermination which is directly opposite said heater at a specified spacing (5 cm), and the radiated far-infrared rays excite thermal agitation within the subject B of extermination to raise the temperature thereof; consequently the extermination of acarid inhabitant within is effectively performed.

When the surface temperature of the subject B of extermination which is detected by the radiant temperature sensor 40 exceeds 80° C. or an established value in the temperature setting circuit 42, the temperature control circuit 43 issues a control signal c and a control signal d; the control signal c opens the power source supply circuit to the surface heater 20 to stop the radiation of far-infrared rays, and, at the same time, the control signal d closes the power source supply circuit to the cross-flow fan 30 to start a forced draft and cause a forced cooling on the subject B of extermination, therefore, a secure prevention of the burning of the subject B of extermination is enabled.

As previously described, the buzzer alarm sounds and warns by sound when the surface temperature of the subject B of extermination exceeds the established temperature (80° C), and therefore, by slowly moving the acarid extermination device A along the surface of the subject B of extermination at such a speed that the buzzer alarm sound intermittently, said subject B of extermination which is left spread on the floor can be heated to the established temperature in one area after another area in succession, and the extermination of acarid can be easily performed; accordingly, the operation to transfer tatami mats, carpets and others outside of the room can be made unnecessary, and the operation efficiency can be improved.

In an experiment where a surface heater 20 with an output of 1 kW (one kilowatt) is used and the heater surface 20*a* of said heater 20 is set at a height of 5 cm above the top surface of the subject B of extermination was heated up to 80° C. in 5 to 6 seconds after the start of far-infrared ray radiation. On the other hand, the dust ticks sealed in a polyvinyl bag was radiated for 5 seconds with the far-infrared rays under the conditions as described above, and, as a result, the death rate of the dust ticks was found to be 100%.

Subsequently, by using the same conditions as in the above (a height of 5 cm, far-infrared radiation, period of 5 seconds), the influence on the subject B of extermination was surveyed, with the result that no such effect as burning, charring or discoloration occurred on the surface of the carpets made of such materials as polyester, nylon or acrylic fibers.

In addition, a strong drying effect will result, because the far-infrared rays perform heating by acting directly on water molecules within the substance, and therefore, the preventive affect against the reappearance of acarid can be maintained for a longer period.

Subsequently, at the interruption or termination of the extermination operation, the surface heater 20 can be forcibly cooled by turning on the manual blower switch 32 to run the cross-flow fan as well as by turning off the main power switch 45 and the power switch 46.

Figure 6:
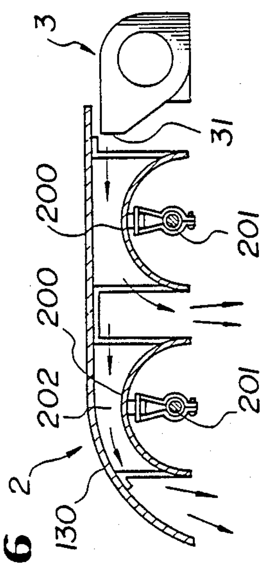
FIG. 6 shows a sectional view to illustrate the main section of a second embodiment in accordance with the present invention.

FIG. 6 shows an acarid exterminating device as a second embodiment in accordance with the present invention.

In this second embodiment, the outlet nozzle 31 of the blower unit 3 is made to be directed toward said ventilation path 202, and cool the reflecting plate 200 by the ventilated air from said outlet nozzle, and at the same time, tò give a preheating of the subject B of extermination by strongly blowing warm air toward said subject B.

In the above, some embodiments of the present invention have been described in detail with reference to the drawing, however, practical structures are never limited to these embodiments, and modification to an extent not deviated from the spirit of the invention will be included in the scope of the present invention.

In the embodiments described above, for example, a case was shown using the wheels 12 and 13 as a practical means for moving the base body 1 along the top side of the subject B of extermination, however the scope of the invention will not be limited to this, and a sled-like means may be used to move the base body over the subject B of extermination.

Further, in the abovementioned embodiments, the movement of the base body was achieved by pushing by hand, however, the present invention will not be limited to this, and self-propulsion by means of an electric motor or other means may be used.

In addition, when a suction inlet of a cleaner provided with a rotating brush has been formed, the dust in the surface section of carpets and others can be eliminated at the same time that the fibers of the carpets are loosened, therefore, the extermination efficiencies for acarid by far-infrared rays can be improved, and moreover, the disadvantage of burning dust and other materials can be eliminated. Further, in this instance, by forming a roller being covered by an adhesive tape, or providing a suction hole for a vacuum cleaner at the rear of the far-infrared emission unit, dust and corpses of acarid exterminated by the radiated far-infrared rays can be removed at the time of extermination, and therefore, operating efficiencies can be improved.

What is claimed is:

1. An acarid extermination device comprising a base body movable along the subject of extermination, a far-infrared ray emission unit, mounted on said base body, for emitting far-infrared rays toward said subject of extermination, and a blower unit for cooling said heated subject of extermination, said blower unit being controlled by a temperature control unit so that said subject of extermination is not heated above an established temperature, wherein said temperature control unit is provided with a radiant temperature sensor to detect the surface temperature of said subject of extermination, a thermometer to indicate said temperature detected, a temperature setting circuit, and a temperature control circuit which makes a comparison between the established input signal from said temperature setting circuit and the input signal of said detected temperature from said radiant temperature sensor, and, in the event that said input signal of the detected temperature is higher than said established input signal, issues a control signal to terminate the operation of said far-infrared ray emitting unit and another control signal to operate said blower unit.

2. An acarid exterminating device as claimed in claim 1, wherein said temperature control unit is provided with an alarm means for warning that said detected temperature of the subject of extermination has exceeded the established temperature.

* * * * *